United States Patent
Lee et al.

(10) Patent No.: US 7,912,573 B2
(45) Date of Patent: Mar. 22, 2011

(54) USING METRIC TO EVALUATE PERFORMANCE IMPACT

(75) Inventors: Seung H. Lee, Bellevue, WA (US);
Charles Z. Loboz, Redmond, WA (US);
Zhongsheng Yuan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 311 days.

(21) Appl. No.: 12/140,297

(22) Filed: Jun. 17, 2008

(65) Prior Publication Data

US 2009/0312983 A1    Dec. 17, 2009

(51) Int. Cl.
*G01C 17/00* (2006.01)
(52) U.S. Cl. ........ 700/182; 702/179; 702/189; 709/200; 709/223; 710/36; 718/103; 718/104
(58) Field of Classification Search .......... 702/179, 702/182, 189; 709/200, 223; 710/36; 718/103, 718/104
See application file for complete search history.

(56) References Cited

U.S. PATENT DOCUMENTS

| | | | |
|---|---|---|---|
| 6,578,068 | B1 | 6/2003 | Bowman-Amuah |
| 6,892,236 | B1 | 5/2005 | Conrad et al. |
| 6,898,556 | B2 | 5/2005 | Smocha et al. |
| 6,922,724 | B1 | 7/2005 | Freeman et al. |
| 7,660,885 | B2 * | 2/2010 | Matsumoto et al. .......... 709/224 |
| 2005/0080696 | A1 | 4/2005 | Bagchi et al. |
| 2005/0160133 | A1 | 7/2005 | Greenlee et al. |
| 2005/0198285 | A1 | 9/2005 | Petit |
| 2006/0195579 | A1 | 8/2006 | Inoue |
| 2007/0130105 | A1 | 6/2007 | Papatla |
| 2007/0185990 | A1 * | 8/2007 | Ono et al. ...................... 709/224 |

OTHER PUBLICATIONS

Zagha et al., 'Performance Analysis Using the MIPS R10000 Performance Counters', 1996, SGI Publication, pp. 1-20.*
"Managing Servers with Server Manager 4.0 from AdRem Software", Date: Aug. 1, 2002, 4 Pages http://support.novell.com/techcenter/articles/nc2002_08b.html.
"Looking for Powerful and Easy Server Monitoring?", 2 Pages, http://www.uptimesoftware.com/servermonitoring.php?_kk=monitoring&_kt=1ec4b6ac-058f-4f25-af68-cfd63bfd58ea&gclid=CPPh9OGv3JICFQQx1Aod_3YC-A.
"OpManager", 3 Pages, http://manageengine.adventnet.com/products/opmanager/server-monitoring.html?gclid=CJT8zcWp3JICFQSU1Aodm1xb-Q.
"Viewing Server Utilization", 1 Page http://publib.boulder.ibm.com/infocenter/tivihelp/v14r1/index.jsp?topic=/com.ibm.tivoli.tpm.mon.doc/monperf/tmon_monutilcpu.html.

* cited by examiner

*Primary Examiner* — Eliseo Ramos Feliciano
*Assistant Examiner* — Elias Desta

(57) ABSTRACT

Analysis may be made of the amount that a load on a machine impacts the machine's performance. Performance counters on the machine record raw statistical data, such as a given resource's current utilization. The values of these counters may be captured. A n-bin histogram may be created that shows how many of the captured performance counter values occur within various ranges, such as 0-10% utilization, 10-20%, etc. A weight may be assigned to each bin. A weighted sum of the bins may be calculated by multiplying the number of occurrences in each bin by the bin's weight, and adding the products together. The weights may be chosen to reflect the relative amounts that particular performance counter values impact the overall performance of a machine. Thus, a metric that represents performance impact may be calculated based on the weighted sum.

19 Claims, 6 Drawing Sheets

USING METRIC TO EVALUATE PERFORMANCE IMPACT

BACKGROUND

One job that computer administrators often perform is to analyze the operation of the machines they oversee. To facilitate analysis, system software on each of these machines typically maintains a set of "performance counters." The counters store various data relating to the operating status of the machines. Performance counters could reflect processor utilization, disk utilization, network traffic, or other aspects of the machine's operation. Machines typically maintain a few thousand counters, which indicate a wide variety of the machine's operational characteristics. The counters may be updated continually, so that, at any given point in time, the counters show the state of the system that exists at that time. Counter values may be captured recurrently (e.g., every minute, every hour, etc.). The captured counter values may be used for forensic analysis of the machine's operational health.

While counter values provide the raw data from which a machine's health theoretically can be assessed, in a real-world setting the amount of data may be too large to analyze, or even to store practicably. Many services are provided through server farms that have tens or hundreds of thousands of machines. If there are 100,000 machines in a server farm, each of which has 1,000 one-byte performance counters, then taking a snapshot of the performance counters across all 100,000 machines results in 100 megabytes of data. If the snapshot is taken once per hour, then the stored counter values amount to 2.4 gigabytes of data per day. 2.4 gigabytes may not be an unmanageable amount, but once per hour might be too low a sampling rate to yield meaningful analysis. For example, a machine might experience a few two- to three-minute spikes in which processor utilization hits nearly 100% of capacity. These spikes would be of interest to an analyst since they likely reflect an impact on the performance of the machine. However, such spikes could go undetected if the sampling rate is once-per-hour. The sampling rate could be increased to, say, once per minute. But with the example numbers above, a once-per-minute sampling rate increases the amount of performance data collected to 144 gigabytes per day. Analyzing performance data collected at this frequency over a period of days or weeks would involve storing terabytes of data.

Storing that volume of data is problematic. However, even if such a large volume of performance data could be stored conveniently, that volume of data would be impractical to analyze in raw form. Certain kinds of abstractions, such as averages and standard deviations, are often applied to raw performance data in order to simplify analysis and to reduce the size of the data to be stored. However, these abstractions present other problems. Averages often strip away meaningful information. For example, knowing that a machine's average processor utilization over a 24-hour period is 25% does not say whether the machine is overloaded. An average of 25% utilization could mean that machine spends all of its time with the processor at 25% utilization, which is probably a manageable load. However, the same 25% average could mean that the machine spends three quarters of its time with its processor at 0% utilization and one quarter of its time near 100%, in which case the machine spends one-quarter of its time in severe overload, and likely experiences performance degradation. Calculating a standard deviation may appear to address this problem by giving some sense of the distribution of the actual data relative to the average. However, a standard deviation is not good at describing data with a distribution that is not normal in the statistical sense (i.e., Gaussian), and many utilization scenarios on a machine are not normal.

One way to simplify analysis of counter values, or other performance data, is to plot the data on a graph. However, it is difficult to glean certain types of information from a graph. For example, if a performance counter value is captured once per minute and plotted against time on a graph, it may be difficult to determine from a visual read of the graph what percentage of a day is spent idling or in overload situations. Moreover, if there are 100,000 machines and a graph is generated for each machine each day, then there are 100,000 graphs per day. In many cases, each machine would have more than one performance counter of interest, and thus there could be more than one graph per machine per day to interpret. Analyzing performance for a large number of machines (e.g., 100,000 servers) by interpreting graphs is very labor intensive, and may not be practical.

SUMMARY

A performance metric may be calculated as an indication of how the load on the machine impacts performance. Performance counters on the machine record raw operational data, such as utilization of the processor or disk, the sizes of various queues, or other operational statistics. The values of these counters may be captured recurrently while the machine operates. A formula may be applied to the counter values in order to calculate a metric, which may be referred to as a performance impact factor. The metric may indicate, as an inference from the counter values, the likely amount that the machine's performance has been impacted.

For example, suppose a performance counter records processor utilization as a percentage of the processor's maximum capacity, and the history of this counter reveals that the machine has spent 10% of its time in the 90-100% utilization range, and the rest of its time below 25% utilization. The metric may indicate an assessment, based on these raw counter values, of the amount of performance impact that the machine is likely to have experienced. The metric may take into account the relative significance of different raw values. For example, a machine's performance may be impacted little by utilization in the 0-25% range, but may be impacted greatly by utilization in the 90-100% range. The 90-100% range is roughly four times the 0-25% range, arithmetically speaking, but the performance impact in the 90-100% range could be much more than quadruple the performance impact in the 0-25% range. The formula may take these differences in performance impact into account, and might assign much greater significance to counter values in, e.g., the 90-100% range.

Metrics may be calculated for many machines, and a report may be generated. For example, a machine might be classified as "hot," "warm," or "cold," based on the metric calculated for that machine. A report could list, for example, all of the "hot" machines, or all of the machines whose metric exceeds some threshold, or the n machines with the highest metrics. An analyst could use the report to discover which machines are experiencing a significant performance impact, or which machines call for a further analysis.

One way to calculate the metric is to collect performance counter values in the form of an n-bin histogram. For example, if the values of a given performance counter fall in the range 0% to 100%, this range could be divided into sub-ranges (e.g., 0-10%, 10-20%, . . . , 90-100%). A histogram could be created, where each bin represents one of the sub-ranges and stores a count of how many of the captured performance counter values fall within that bin's sub-range.

Each of the counts may be multiplied by a weight, and the products of the counts and the weights may be added together to create a weighted sum. The metric may be based on this weighted sum. In one example, the metric may be calculated by dividing the weighted sum by the total number of counter values sampled in the histogram, and the logarithm of the quotient may be calculated. The weights may be chosen based on the relative impact, on performance, of values occurring in each bin. For example, if utilization values in the 90-100% have a much greater impact on performance than utilization values in the 0-25% range, then the weight assigned to the 90-100% bin may be many times that of the 0-25% bin. One way to choose the weight of each bin is to apply a function to representative values in each of the sub-ranges, where the function tends to grow quickly as the upper range is approached.

The metric may represent an assessment of how much of a negative performance impact a machine is experiencing. While the raw performance counter values provide operational statistics, the metric may reflect the actual or estimated performance impact on the machine. Thus, when a large number of machines are being analyzed, the metric may be used to identify machines that warrant attention or further analysis. However, the metric could be calculated in any way, and could be used in any manner and for any purpose.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Administrators of large numbers of machines, such as server farms, often analyze performance of these machines in order to identify machines that are overloaded, or that are otherwise experiencing problems. There may be tens or hundreds of thousands of machines, which perform various different functions and that interact with each other in various different ways. Analysis of these machines may reveal that the current number of machines servicing a particular function is insufficient, or may reveal various bottlenecks in some of the machines. When the machines that are causing a problem are identified, the problem may be remedied.

Machines typically implement performance counters, which provide operational statistics about the machine. For example, a performance counter may provide statistics on the utilization of resources (e.g., the processor, the disk, etc.), the size of queues, the amount of network traffic, or any other statistics. This kind of raw performance data may indicate a condition that exists on a machine. However, a condition is not the same as a problem. For example, a machine's processor might have an average utilization of 60%. This statistic may, or may not, indicate the existence of a bottleneck on the machine. If the machine is performing well, then the machine may be of no concern to an administrator. On the other hand, if the 60% average processor utilization results from a condition that is causing service delays to users of the machine, then this statistic may be of concern. When tens or hundreds of thousands of machines are being administered, it makes sense to direct administrative and remedial resources based on where the performance problems are, rather than based on raw statistics. Thus, administrators may care less about what the raw statistics are, than about what the statistics say about the possible or likely existence of a performance problem.

System analysis focuses on interpreting raw statistics such as performance counters to identify problems. However, analysis may be labor intensive. Averages, standard deviations, graphs, and other statistical tools may condense the data to aid analysis. However, these tools often strip away information from which the existence (or non-existence) of a performance impact could be inferred. Moreover, analyzing the raw data, or even data that has been condensed using the statistical tools mentioned above, may be labor intensive or may suffer from other deficiencies. The subject matter described herein may be used to identify performance problems efficiently based on raw statistics such performance counters.

Figure 1:
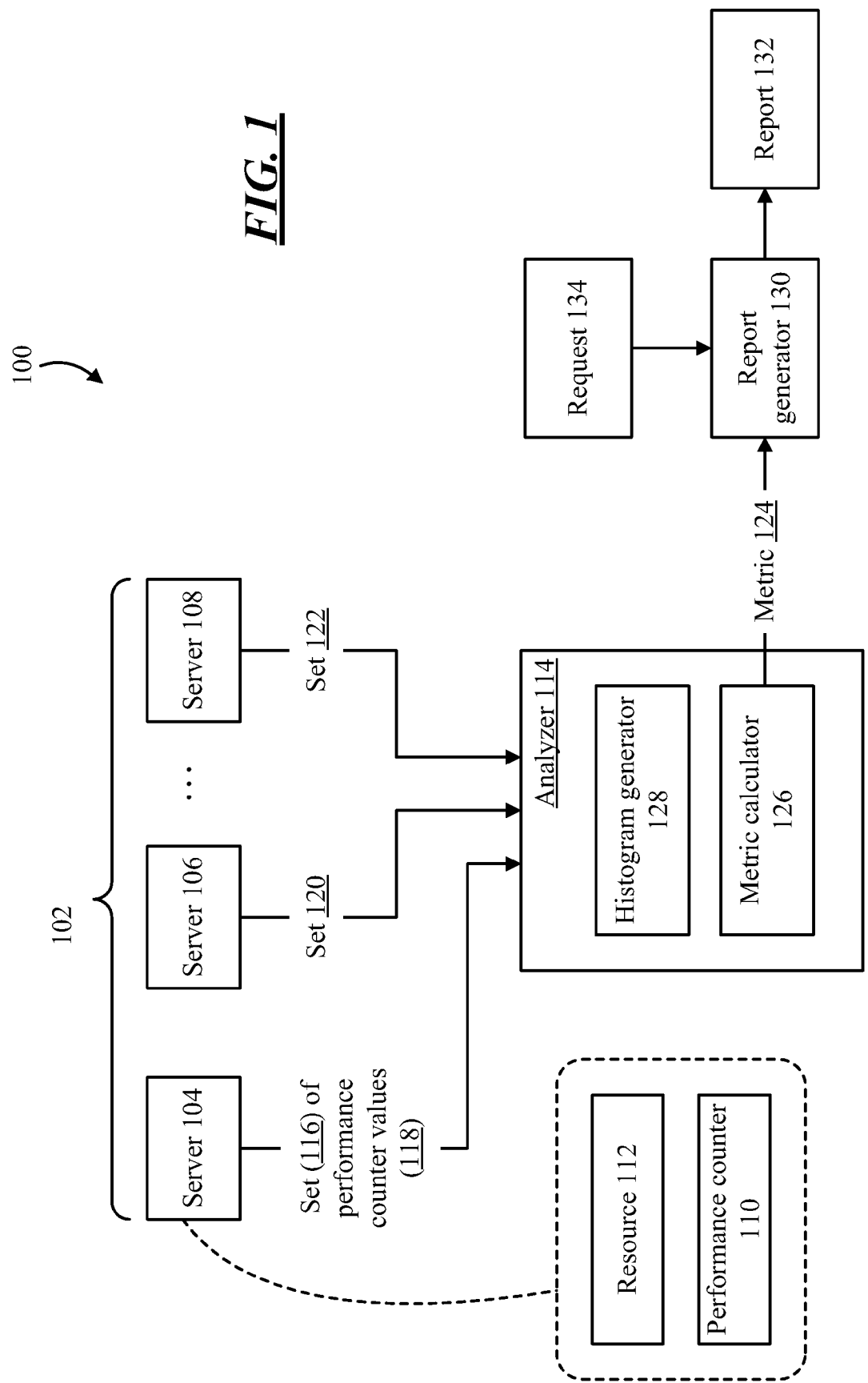
FIG. 1 is a block diagram of an example system in which performance impact on various machines.

Turning now to the drawings, FIG. 1 shows an example system 100 in which performance impact on various machines may be analyzed. System 100 comprises a plurality of machines 102. In the example of FIG. 1, machines 102 are shown as servers 104, 106, and 108, which could be part of a "server farm." However the subject matter herein is not limited to servers or server farms; rather, machines 102 could be any kind of machines. Also, in the example of FIG. 1, three of machines 102 are shown, although there could be any number of machines. In a large-scale server farm of other type of collection of machines, the number of machines could be in the tens of thousands or hundreds of thousands.

Each of machines 102 may have one or more performance counters. For example, server 104 has performance counter 110. To simplify the illustration of FIG. 1, a single performance counter for a single one of machines 102 is shown, although it will be understood that any machine could have any number of performance counter. Typically, each of machines 102 has performance counters, and typically the number of performance counters on a given machine is in the hundreds or thousands. However, the subject matter described herein is not limited to any particular number of performance counters.

Example performance counter 110 provides data relating to resource 112. Various types of data could be obtained for various types of resources. In one example, resource 112 is a processor that executes instruction on server 104, and performance counter 110 reflects the current utilization of that processor as a percentage of the processor's capacity. Thus, performance counter might, at any given point in time, acquire a value in the range 0% to 100%, depending on the current level of utilization of the processor. Similar utilizations values could be measured for other resources, such as a disk, network interface, serial port, or any other resource. Performance counter 110 could also measure aspects of server 104's operation other than a resource utilization percentage. For example, there may be a queue of data that is waiting to be written to disk and/or to be sent out via a network interface, and performance counter 110 could measure the size of one of these queues. As additional examples, performance counter 110 could measure the current number of active processes or threads on server 104, the number of network connections being serviced at a given time, or any other aspect of server 104's operational status.

Performance counters are a form of raw data that can be collected about a machine. However, the value of a given performance counter may not provide an intuitive indication of how well the machine is performing under given conditions. Thus, performance counter values may be provided to analyzer 114. Analyzer 114 may attempt to assess, based on the performance counter values, whether performance has been impacted and the extent of the impact.

Analyzer 114 receives a set 116 of performance counter values 118 that were captured at one or more of machines 102. Analyzer 114 may calculate a metric that indicates an estimate of performance impact based on the captured counter values. Each set of performance counter values could be captured from one machine, or could be captured from a plurality of machines. For example, each of machines 102 could provide its own set of performance counter values to analyzer 114, so that analyzer 114 may calculate a metric for a particular machine. Or, as another example, machines could be grouped together in some way, and a set of captured performance counter values could be provided for machines that are members of that group. In a typical server farm, different functionalities are assigned to different groups of machines. For example, in a cluster of servers that implements a web-retail function, some machines could be assigned to front-end interactions with users, and other machines could be assigned to perform back-end transactions or management of a sales database. In a search engine context, some machines could be assigned to process queries from users and other machines could be assigned to perform back-end mining of the corpus of data to be searched. Machines could also be grouped by geography, ownership, or any other criteria. In the example of FIG. 1, each of servers 104, 106, and 108 is shown as providing its own set 116, 120, and 122, respectively, of performance counter values. However, a set of performance counter values could be for a single machine or for a plurality of machines, and the subject matter herein applies to any such scenario.

Performance counter values may be captured recurrently at various instances during some duration of time. The recurrent capture of performance counter values may take place at regular intervals, but could also take place at irregular intervals. As further discussed below, one possible implementation of the subject matter herein allows performance counter values to be represented with a small amount of data even if the values are captured very frequently (e.g., every 1.5 seconds), although values could be captured at any frequency.

Analyzer 114 receives one or more sets 116, 120, and 122 of performance counter values, and calculates metric 124, which indicates the amount of performance impact on the machines (or group of machines) that contributed the captured values. Analyzer 114 may use a metric calculator 126 to calculate metric 124. Metric calculator may calculate the metric 124 in any manner.

One way to calculate the metric is to multiply the occurrence of captured values by different weights and to add the weights together to create a weighted sum. The weights may be chosen to reflect the relative significance of different counter values in assessing performance impact. For example, if the performance counter values represent utilization of a resource as a percentage of its maximum capacity, then low values such as 5%, 15%, and 25% may be expected to indicate relatively little impact on performance, so these values could be assigned low weights. On the other hand, high values such as 85% and 95% may be expected to have a relatively large impact on performance, so the weights assigned to these values could be relatively high. The amount that performance is impacted as a result of processor utilization may be expected to grow non-linearly. For example, consider three resource utilization values, 25%, 50%, and 100%. Each of the values in this list is twice the preceding value in the list. However, doubling the utilization value may have more than double, or less than double, the affect on performance, depending on whether the value being considered is toward the upper or lower end of the 0-100% range. As a concrete example, a jump in resource utilization from 25% to 50% doubles the percentage of utilization, but might not cut performance in half. On the other hand, a jump from 50% to 100% also doubles the percentage of utilization, but might cut performance by a factor of ten, or even one-hundred. The weights may be chosen to take this issue into account.

In one example, the weights of a particular utilization value, u, is proportional to the function $w=1/(1-u)^n$. (The weight is referred to as being "proportional" to the expression in the sense that the result of the function might be numerically scaled upward or downward by multiplying it by a constant, C.) In this example function, the percentage u is expressed in the range zero to one, with 0.0 representing 0% and 1.0 representing 100%. However, the exact numerical representation of a percentage is unimportant, and any bounded range of values could be normalized so as to be expressible in the range zero to one. (The description herein may refer to a "proportion" that is expressible in a particular range, in order to abstract the detail as to the exact numerical system that is used to express the range. For example, percentages in the range 0-100% are examples of "proportions" that are "expressible" in the range 0.0-1.0, even if they are not actually expressed in that manner.) In the above function, values of n that fall on a continuum in the range $0.5 \leq n \leq 4.0$ may cause weights to be assigned in a way that produce accurate metrics, although exponents outside of this range could be used. In one example, n=3 so that the weight assigned to a given performance counter value is proportional to an inverse cubic of the value. Using a function such as the one above, the amount that the weight increases tends to grow faster than a linear function as the upper end of the value range is approached—e.g., as u→1.0, $1/(1-u)^n$ gets very large. When the function has this property, it tends to weight high performance counter values as having a much more severe impact on performance than low performance counter values. At least in the case of utilization counters, this relationship between counter values and performance is in line with both experience and queuing theory.

Figure 2:
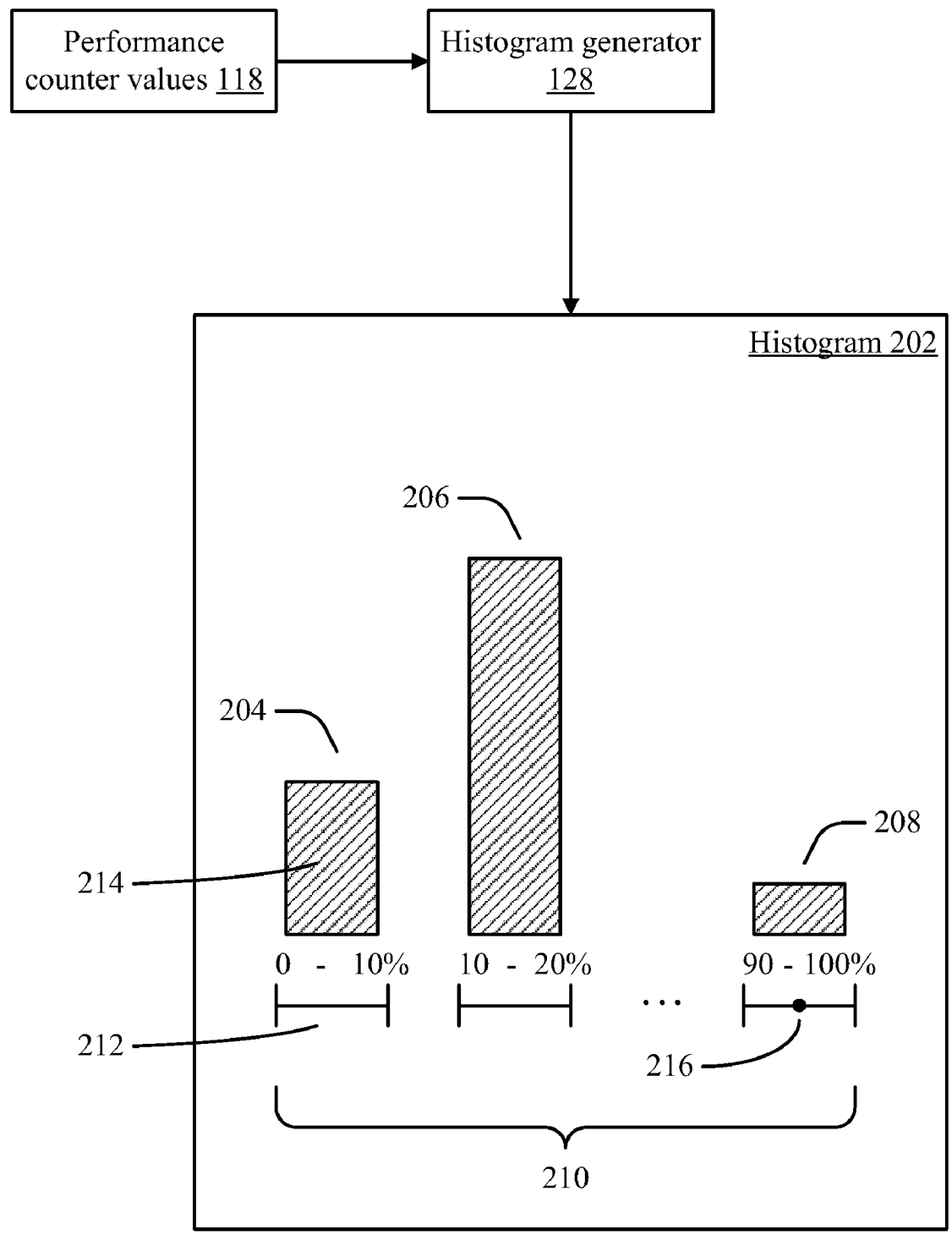
FIG. 2 is a block diagram of an example histogram that could be created by a histogram generator.

Metric calculator 126 could apply weights directly to performance counter values 118. However, calculating metric 124 in this matter may involve storing all of the performance counter values collected during some period, which may use a large amount of storage space. Thus, one optimization is to create an n-bin histogram of the performance counter values that counts occurrence of values within various ranges. For example, the bins might represent sub-ranges of the 0-100% range, such as 0-10%, 10-20%, etc. Each bin would store a count of how many times a value in that bin's range occurs in a set of performance counter values. Each bin could then be assigned a weight, the count in each bin could be multiplied by that bin's weight, and the resulting products could be added together to create a weighted sum. Analyzer 114 may employ a histogram generator 128 to create this histogram, so that metric calculator 126 may calculate the metric based on the histogram. FIG. 2, described below, shows an example of how this optimization could be implemented, although the subject matter herein may calculate a metric where or not a histogram is used to represent a set of performance counter values.

Analyzer 114 may calculate metrics for one or more sets of performance values. For example, if each of machines 102 contributes its own set of performance counter values, then analyzer 114 may calculate a metric for each machine. Or, if performance counter values are collected by groups of machines, then analyzer 114 may generate a metric for each group of machines. Moreover, analyzer 114 could generate several metrics for each machine or group of machines (or a single metric that contains a vector having several values). For example, there may be different metrics calculated based on different performance counters—e.g., one metric representing processor utilization, another metric representing network utilization, another representing disk queue size, etc. If there are plural metrics for a machine, then the plural metrics could be taken into account in various ways. For example, a machine's highest metric could be considered indicative of the machine's performance on the theory that the most overloaded resource on the machine (as represented by one of the metrics) represents a bottleneck that slows down the entire machine even if other resources are functioning normally.

Regardless of the number of metrics calculated, these metrics may be provided to report generator 130. Report generator 130 generates a report 132 about performance impact that may exist on machines 102. Report 132 may take any form, and may include any kind of content. Report 132 could simply list the metric(s) for each of the machines. However, one possible use of report 132 is to identify machines for which further analysis is warranted in order to allow human analysts to focus on problematic machines and to avoid spending time on other machines. Therefore, report 132 may select or highlight particular machines based on the apparent or estimated amount that their performance has been impacted (as indicated by the machines' metric(s)). For example, report 132 may indicate those machines whose metric exceeds some threshold, or it could indicate the n machines having the highest metric, or it could classify the load or performance impact of machines using descriptive labels like "hot," "warm," and "cold," based on the metric.

Report 132 may be based on a particular request 134 for information. One example of request 134 is a query that describes particular information to be generated in a report. For example, request 134 could specify that the report is to list all machines whose metric(s) exceeds some threshold, or could specify that the n-most-impacted machines (as indicated by their respective metric(s)) are to be listed in the report. Such a request could be provided, for example, by an administrator in order to obtain a report tailored to the administrator's specifications. However, a request could be issued by any source. Moreover, a report could be created without being responsive to any particular request. For example, report generator 130 could generate report 132 at particular intervals, e.g., once per day, once per week, etc.

As noted above, one way to calculate a metric from performance counter values is to collect the values in the form of an n-bin histogram. FIG. 2 shows an example of a histogram that could be created by a histogram generator.

Histogram generator 128 receives a set of performance counter values that were captured at some machine or group of machines. In the example of FIG. 2, histogram generator receives performance counter values 118 captured on server 104 (shown in FIG. 1), although histogram generator 128 could receive any set of performance counter values. Histogram generator 128 uses performance counter values 118 to generate histogram 202.

Histogram 202 has a plurality of bins, such as bins 204, 206, and 208. Each of the bins corresponds to a particular sub-range of values that are acquirable by a performance counter. In one example, the performance counter represents a resource's utilization as a percentage of its capacity, and thus the range 210 of values acquirable by the counter is 0-100% (which, depending on implementation, might be represented as 0-100, 0.0-1.0, or using some other numerical scheme). Thus, range 210 may be divided into sub-ranges or regions, and each sub-range or region could be assigned to a bin. For example, sub-range 212 represents the 0-10% sub-range, and is assigned to bin 204. (Depending on context, a "sub-range" may sometimes be referred to herein as a "range".) Histogram 202 also includes bins for sub-ranges 10-20% (bin 206), 90-100% (bin 208), and for the various sub-ranges in between. Sub-ranges could be of uniform size (e.g., each sub-range shown in FIG. 1 is of size $\Delta 10\%$), although sub-ranges could be of non-uniform sizes (e.g., 0-50%, 50-75%, 75-90%, 90-100% could be the sub-ranges of a histogram's bins).

In the example of FIG. 2, the values that may be acquired by a given performance counter is a percentage, and thus range 210 is bounded on both sides by minimum and maximum values (i.e., zero and one-hundred). However, some performance counters do not represent percentages, or are otherwise unbounded on either one side or both sides. Even if potential range of counter values lacks a bound on one or both sides, a histogram could still be created. In such a case, bins could be created that represent sub-ranges, where the lowest and/or highest sub-ranges are unbounded on one side. For example, sub-ranges could be defined as $-\infty$ to $-10$, $-10$ to 0, 0 to 10, and 10 to $\infty$. Sets of any kinds of counter values could be represented in the form of a histogram.

Each bin in the histogram may maintain a count, which represents the number of times that a value falling in to the bin's sub-range occurs among a set of performance counter values 118. Thus, bin 204 has count 214 (represented by the vertical bars with diagonal lines), and bins 206 and 208 each have their respective counts. For example, if set of performance counter values includes the values 1%, 3%, 4%, and 7%, these values fall into sub-range 212 assigned to bin 204, and thus would increase the value of count 214 by four. A value may occur more than once in a set of counter values, in which case it is counted more than once. Thus, histogram 202 may reflect not only the distribution of performance counter values but also the counter values' frequency of occurrence.

As noted above, a metric may be calculated based on a set of performance counter values by calculating a weighted sum that multiplies the occurrence of performance counter values by the weights. The weighted sum may be calculated based on histogram 202, by having a particular value in each of the bins to represent the weighted sum. Thus, if B is a set of bins, and if $w_i$ and $c_i$ are the weight and count, respectively, of the i-th bin, then a weighted sum of performance counter values may be calculated from histogram 202 using the formula $\Sigma_{i \in B} w_i c_i$.

To choose the weights assigned to each bin, a representative value may be chosen from the sub-range that the bin represents. Histogram 202 is an approximation of the underlying performance counter values, in the sense that histogram 202 treats all values in a sub-range as being the same. Values such as 91%, 93% and 95% all fall into the same bin 208, so in order to find a weight for that bin, a representative value from the bin's sub-range is taken, and a function may be applied to that representative value in order to calculate the weight associated with that bin. Value 216 is a representative value of bin 208. Value 216 may be, for example, the midpoint of the sub-range represented by a bin (e.g., 95%, in this example), although value 216 could be chosen in any manner—e.g., the high- or low-point in a sub-range, or any arbitrary value.

Figure 3:
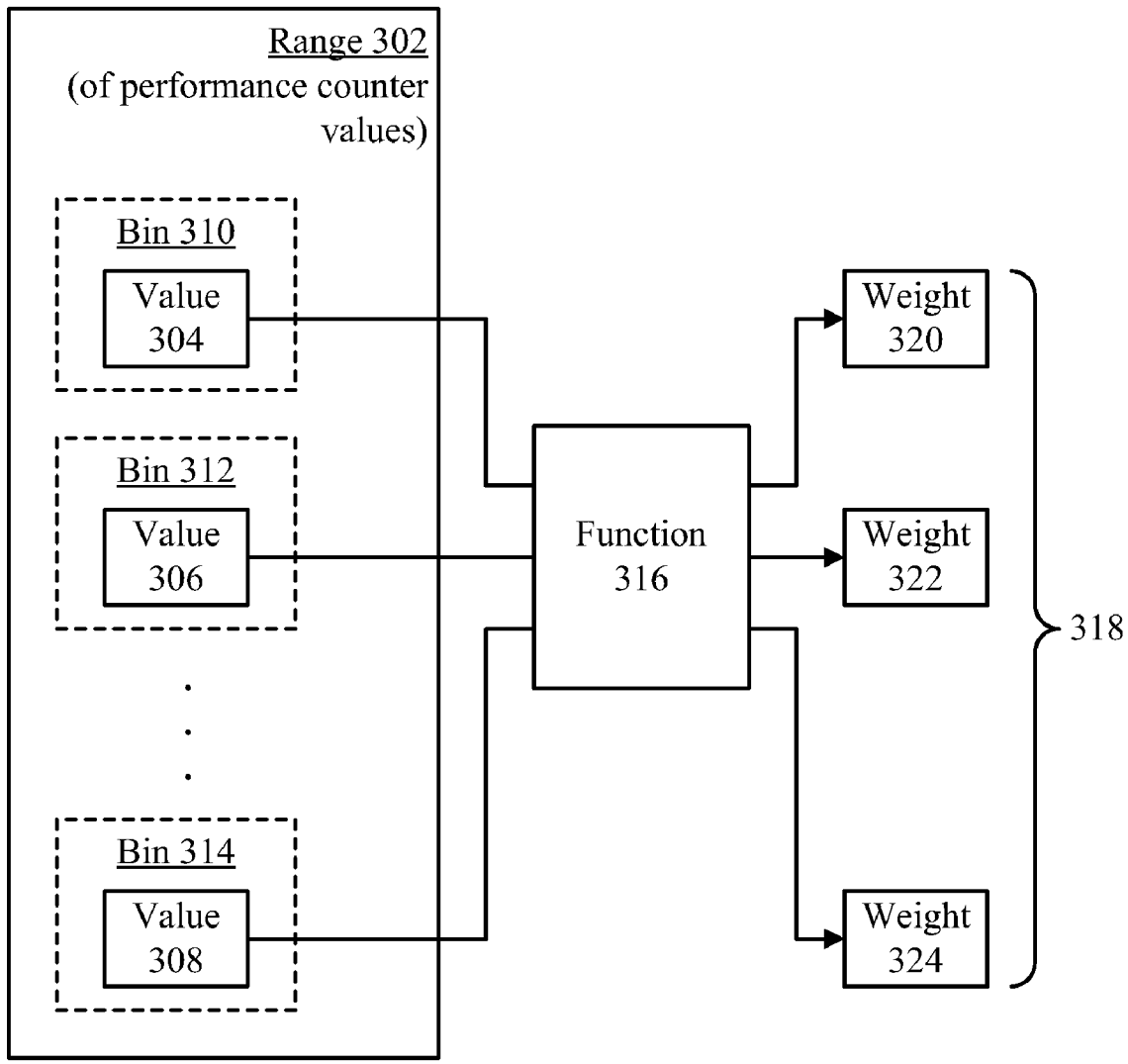
FIG. 3 is a block diagram of an example function that assigns weights to bin.

As noted above, a weight may be chosen by a function, such as $1/(1-u)^n$. FIG. 3 shows an example of how a function may be used to assign weights to bins. A performance counter may acquire values in range 302. Among these values, a particular set of values is chosen to represent the various bins. In the example of FIG. 3, values 304, 306, and 308 represent bins 310, 312, and 314, respectively. Function 316 is applied to the values to generate weights 318 for the values. Thus, weights 320, 322, and 324 are generated by applying function 316 to values 304, 306, and 308, respectively. Each weight may be assigned to represent a particular bin. For example, since weight 320 is generated from value 304, and since value 304 is representative of bin 310, weight 320 may be assigned to represent bin 310. Similarly, weights 322 and 324 may be assigned to represent bins 312 and 314, respectively.

The following is an example of how function 316 could be applied to generate weights for bins in a histogram. Suppose that the histogram has 10 bins, each representing Δ10% sub-ranges within the range 0-100% (i.e., 0-10%, 10-20%, etc.) The low-point of each sub-range could be taken as that sub-ranges representative value, and the function 316 used to calculate the weights could be $1/(1-u)^3$. (In this example, u is in the range 0.0-1.0, and expresses a percentage from 0-100% as a fraction of 1.0.) Thus, taking the low-points of each sub-range (u=0.0, 0.1, 0.2, etc.), and applying the function to those values of u, the weights for each bin could be chosen as follows:

TABLE 1

| Sub-range of bin (numerical representation) | Weight |
|---|---|
| 0-10% (0.0-0.1) | 1.0000 |
| 10-20% (0.1-0.2) | 1.371742 |
| 20-30% (0.2-0.3) | 1.953125 |
| 30-40% (0.3-0.4) | 2.915452 |
| 40-50% (0.4-0.5) | 4.629630 |
| 50-60% (0.5-0.6) | 8.000000 |
| 60-70% (0.6-0.7) | 15.625000 |
| 70-80% (0.7-0.8) | 37.037037 |
| 80-90% (0.8-0.9) | 125.000000 |
| 90-100% (0.9-1.0) | 1000.000000 |

As can be seen, this choice of weights causes the significance of performance counter values to grow quickly as the values approach the upper end of the 0-100% range. However, the foregoing is merely an example, and weights could be assigned to bins in any manner. As noted above, assigning weights based on the function $1/(1-u)^n$, where n is chosen from values along a continuum such that $0.5 \leq n \leq 4.0$ may assign weights in a way that support calculation of accurate metrics, although different values of n, or entirely different functions, could be used to assign the weights.

Figure 4:
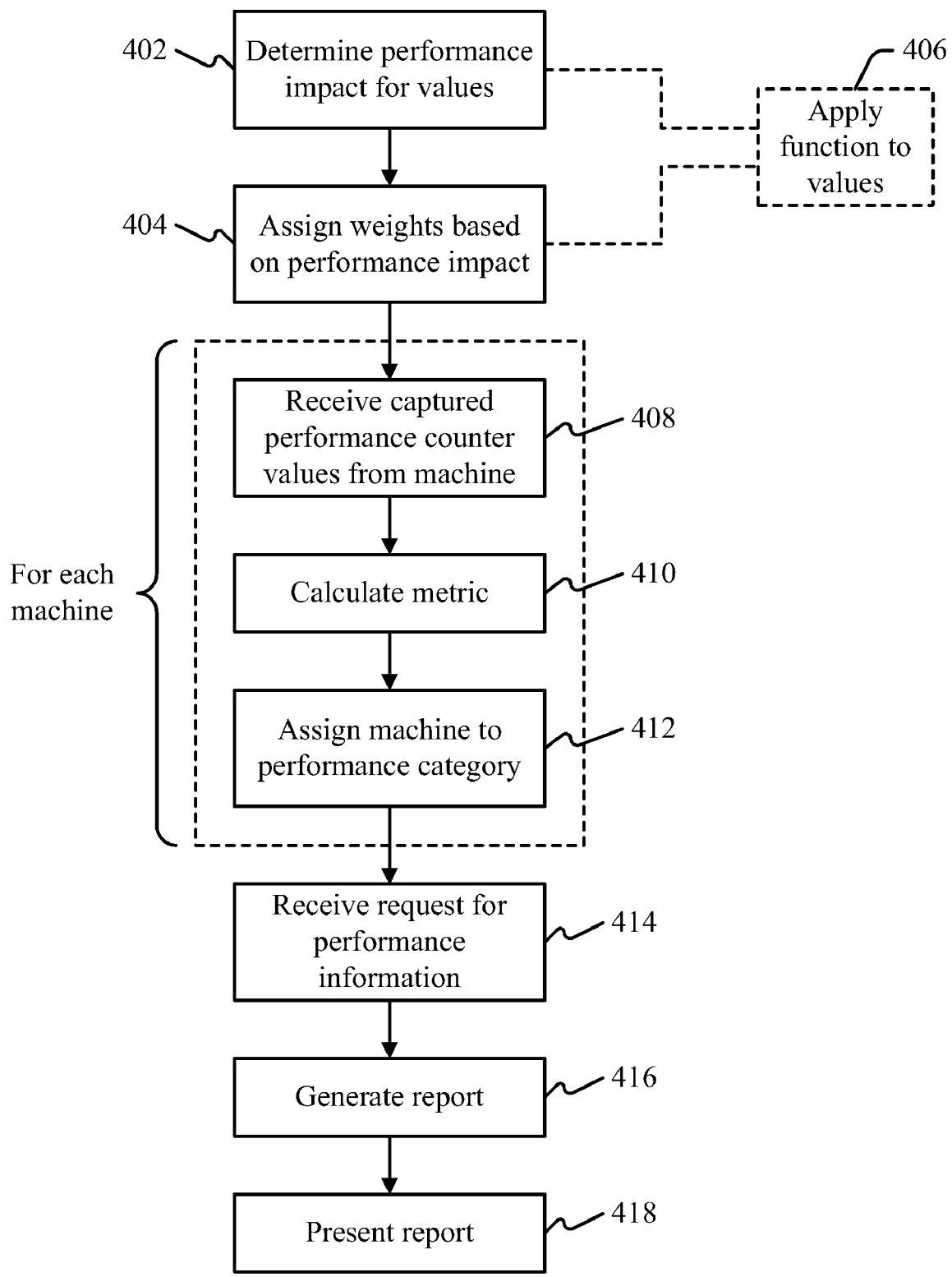
FIG. 4 is a flow diagram of an example process of assessing performance impact on machines.

FIG. 4 shows an example process of assessing performance impact on machines. It is noted that the various flow diagrams herein (in FIG. 4 as well as in FIG. 5) show examples in which stages of a process are carried out in a particular order, as indicated by the lines connecting the blocks, but the various stages shown in these diagrams may be performed in any order, or in any combination or sub-combination.

At 402, a determination is made of the performance impact represented by various performance counter values. For example, if a performance counter indicates utilization as a percentage of maximum capacity, then an assessment could be made of what particular counter values (e.g., 5%, 15%, 75%, etc.) say about the performance impact that would be experience on the machine if those values actually arose on the machine. Based on the determined performance impact, weights are assigned to the various values (at 404). As described above, the weights could be assigned to specific values that are representative of bins in a histogram. However, weights could be assigned to any value in the range of a particular performance counter, regardless of whether a histogram is used to represent the performance counter values obtained from a machine.

One way to determine performance impact for values and to assign weights is to apply a function the values (at 406). As discussed above, FIG. 3 shows an example in which a function is applied to representative values of the bins in a histogram in order to create weights for those bins. Moreover, Table 1 describes a specific example in which weights are assigned to bins by applying the function $1/(1-u)^3$ to the low-point of each bin's sub-range. When a function is used in this way, the function represents a determination of how particular counter values relate to performance impact. Thus, applying a function to particular counter values is one example of a way to determine the performance impact associated with those values and to assign weights to those values. However, the determination of the performance impact associated with a particular value, and the assignment of weight to that value, could be performed in any manner, regardless of whether a function is used. As another example, impact could be determined and weights could be assigned based on experimental results and/or anecdotal experience, without using a mathematical function.

Blocks 408, 410, and 412 may be performed for each machine to be analyzed (or for each group of machines). At 408, performance counter values that have been captured at a particular machine (or group of machines) is received. For example, a set of counter values captured at a given machine could be received by analyzer 114 (shown in FIG. 1), although the counter values could be received by any component. At 410, a metric may be calculated based on the received values. The metric could be calculated by metric calculator 126, possibly with the aid of histogram generator 128 (both shown in FIG. 1), although the metric could be calculated by any component. At 412, the machine (or group of machines) for which the metric was calculated may be assigned to a particular performance category based on the metric. For example, Table 2 shows some example categories that could be assigned based on example metric values.

TABLE 2

| Metric | Category |
|---|---|
| 0.0-0.1 | Dead cold |
| 0.1-0.3 | Cold (underutilized) |
| 0.3-1.0 | Tepid to warm |
| 1.0-2.0 | Hot |
| 2.0-3.0 | Drastic overload |

In Table 2, it will be understood that the relationship between values in the "metric" column and descriptions in the "category" column are merely arbitrary examples, and that the significance of any particular numerical value (like 1.0) would depend on how the metric is calculated.

Using blocks 408-412 as described above, metrics may be calculated based on the performance counters captured from various different machines (or groups of machines).

At 414, a request for performance information may be received. For example, an administrator could issue a request for a performance report, or could issue a query for certain types of performance information (e.g., all machines in the "drastic" category, or the machines have the ten highest metrics). At 416, a report is generated. The report may be generated in response to a request. However, a report could also be generated without a request having been made (e.g., a system could be set up to generate a report every hour, every day, every week, whenever a machine moves from one category to another, or at any other time). At 418, the report is presented. For example, the report could be displayed on a monitor, printed on paper, or presented in any other way.

Figure 5:
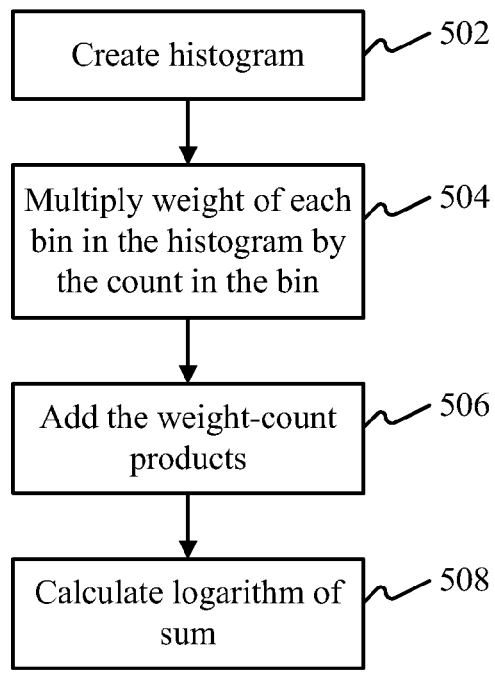
FIG. 5 is a flow diagram of an example process in which a metric may be calculated.

As noted above, a metric may be calculated in FIG. 4 at 410. FIG. 5 shows an example process that implements a formula by which a metric may be calculated. At 502, a histogram may be created based on sets of performance counter values that were captured at one or more machines. As described above in connection with FIG. 2, the histogram may comprise bins that represent various ranges of performance counter values. Each bin may store a count of the number of values that occur in the range or sub-range represented by the bin. As further described above, a weight may be associated with each of the bins. At 504, the weight associated with each of the bins is multiplied by the count in that bin. At 506, the products of the weights and the counts may be added together to create a sum. As described above, the expression $\Sigma_{i \in B} w_i c_i$ describes the sum, over all bins B in a histogram, of the weight-count products. Thus, this expression may be calculated at 506. The sum may be divided by the total number of captured values that the histogram represents (e.g., dividing by $\Sigma_{i \in B} c_i$) in order to allow calculated metrics to be compared independently of how many counter values a metric calculation is based on. Dividing the metric by the total number of values represented in the histogram means that two metrics may be compared, even if one metric was derived from 1,000 values and another was derived from 1,000,000 values. At 508, a logarithm of the sum may be calculated. Calculating the logarithm at 508 may help to keep the metric as a small value in view of the fact that weights used to calculate the metric grow at higher-than-linear rates near the top of the range of counter values. The metric may be the value that that results from the process of FIG. 5, from any portion of that process (or from carrying out some other process).

Figure 6:
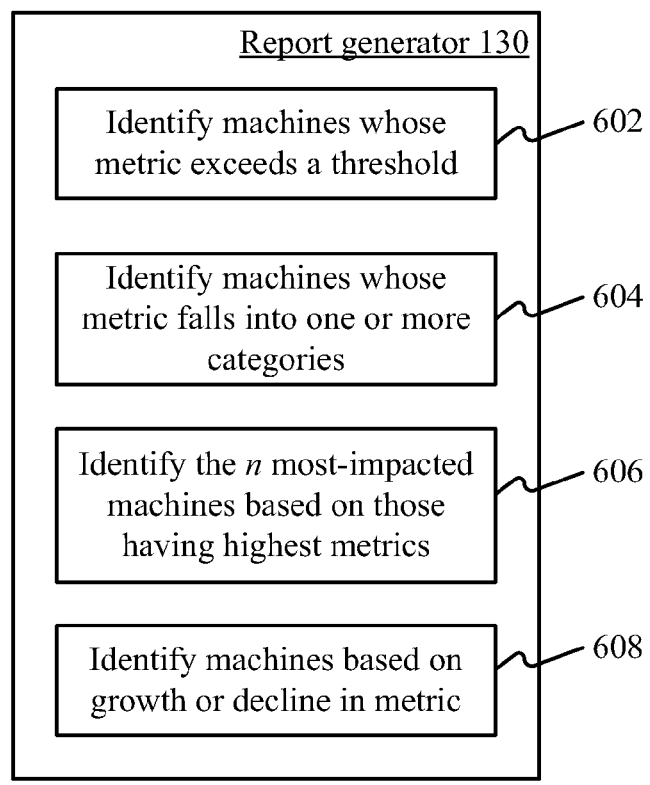
FIG. 6 is a block diagram of various actions that could be performed by a report generator.

As noted above, a report may be generated based on the various metrics calculated for a machine or for a group of machines. FIG. 6 shows examples of various actions that could be performed by report generator 130.

One action that report generator 130 could perform is to identify machines whose metric exceeds a threshold (block 602). For example, an administrator might request to identify all machines whose metric is greater than, say, 2.5. Report generator 130 could then generate a report that contains an identification of machines that exceed the threshold. In one variation, report generator 130 could identify those machines whose metric lies in a particular range—e.g., between 1.5 and 2.5.

Another action that report generator 130 could perform is to identify machines whose metric falls into one or more categories (block 604). For example, with reference to the categories of Table 2, report generator 130 could identify those machines that fall into the "hot" or "drastic" categories. An administrator could request to identify specific categories, and a report could be provided that responds to the request.

Yet another action that report generator 130 could perform is to identify some number of the most-impacted machines, based on metrics (block 606). For example, report generator 130 could identify the n machines that have the highest metrics, and could include an identification of these machines in a report. The number of machines to be identified could be specified as part of a request made to report generator 130.

As yet another example, machines could be identified based on patterns of growth or decline in their metrics (block 608). For example, the metrics on machines could be monitored for days or weeks. Machines that appear to be experiencing increasing performance impacts (as indicated by their metrics) could be identified based on trends or patterns that are detected in the machines' metrics. Conversely, machines that appear to be experiencing decreasing performance impacts could be identified as well.

The foregoing are some examples of actions that a report generator 130 could take toward generating a report. However, any other actions could be taken, and these actions could be performed by any component.

Figure 7:
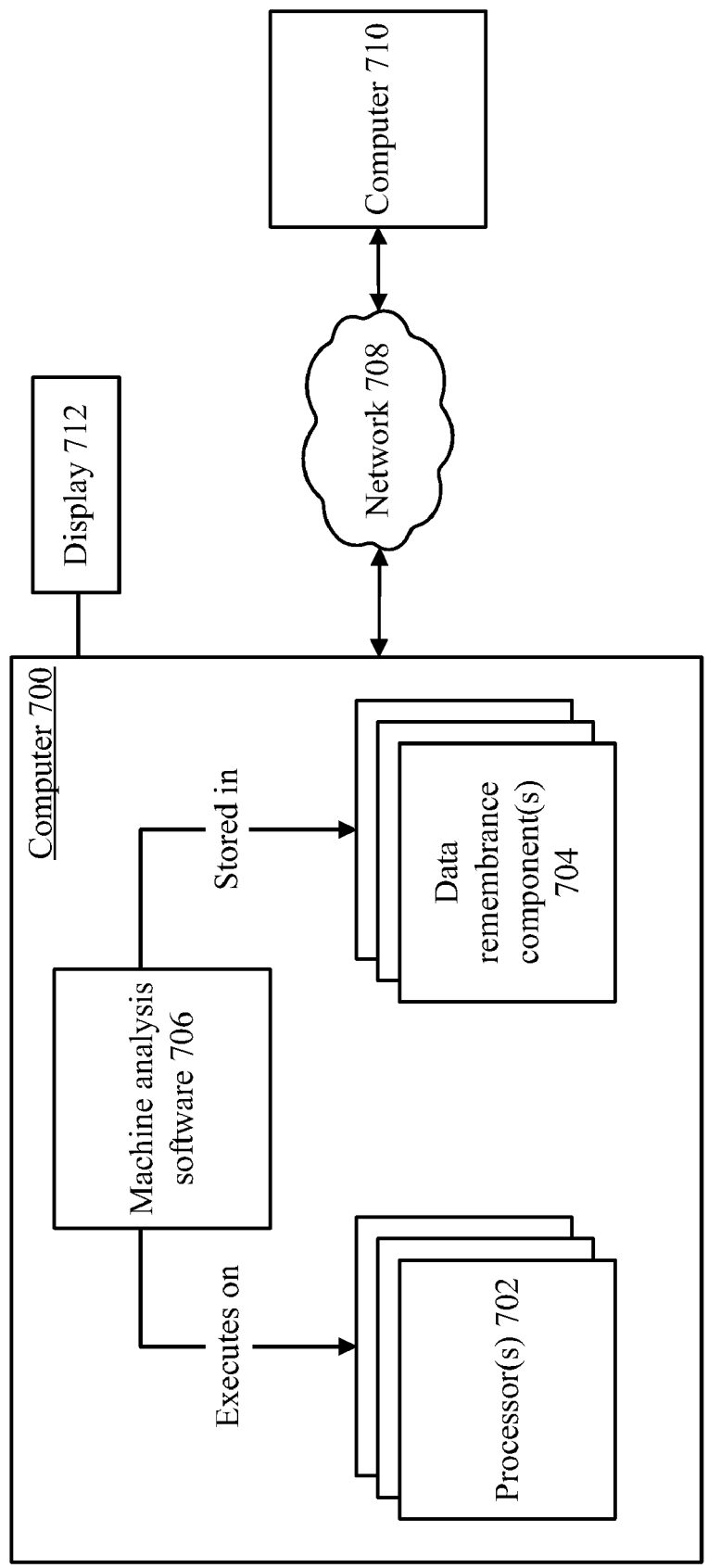
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is machine analysis software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of analyzing performance of a plurality of machines, each of the machines maintaining a performance counter that can acquire values within a range, the method comprising:
   determining amounts of performance impact associated with each of a plurality of values in the range;
   assigning weights to each of the plurality of values based on a determined performance impact associated with each of the plurality of values;
   for each machine among the plurality of machines:
      receiving a set of performance counter values captured from the machine's performance counter at instances during a period of time; and
      calculating a metric for the machine by applying a formula to the set, the formula being based on the weights; and
   presenting a report that is based on metrics calculated for the plurality of machines,
   wherein said assigning of weights comprises:
      applying, to said plurality of values, a function that grows faster than a linear function as a maximum value within said range is approached.

2. The method of claim 1, further comprising:
   for each machine among the plurality of machines:
      creating a histogram for the set of values captured from the machine, the histogram having a plurality of bins in which each bin represents a sub-range of the range, each of the bins storing a count of a number of occurrences of performance counter values in the set that fall within a given bin's sub-range, each of the bins being associated with one of the weights, and wherein said calculating comprises:
         multiplying a weight associated with each bin by the count stored in that bin.

3. The method of claim 2, wherein the bins represent uniformly-sized sub-ranges of the range.

4. The method of claim 1, wherein said assigning comprises:
   applying, to each of the plurality of values, u, a function based on $1/(1-u)^n$, where $0.5 \leq n \leq 4.0$.

5. The method of claim 1, further comprising:
   identifying which of the metrics exceeds a threshold, wherein the report comprises an identification of those machines whose metric exceeds said threshold.

6. The method of claim 1, further comprising:
   identifying the n highest values among said metrics, wherein the report comprises an identification of machines whose metrics are among the n highest values.

7. One or more computer-readable storage media that store executable instructions to perform a method of analyzing performance of a machine, the method comprising:
   receiving a plurality of performance counter values generated by said machine;
   based on said plurality of performance counter values, creating a histogram that represents (a) a plurality of different ranges of said performance counter values and, (b) for each range, a count of a number of occurrences of each of the performance counter values that fall into the range;
   calculating a metric that is based on said histogram, wherein said metric is based on a formula that is based on a weighted sum of counts in each of the ranges, wherein, in said weighted sum, each count is multiplied by a weight that is assigned by a non-linear function of representative values of the ranges; and
   presenting a performance report that comprises or is based on said metric.

8. The one or more computer-readable storage media of claim 7, wherein said performance counter values represent a proportion of maximum utilization of a resource, said proportion being expressible as a value between zero and one, and wherein, for a representative value, u, of each of said ranges in said histogram, said function assigns to each of the ranges a weight that is proportional to $1/(1-u)^n$, where $0.5 \leq n \leq 4.0$.

9. The one or more computer-readable storage media of claim 7, wherein said formula is further based on a logarithm of said weighted sum, and wherein said metric is proportional to said logarithm.

10. The one or more computer-readable storage media of claim 7, further comprising:
    assigning said machine to one of a plurality of performance categories based on said metric,
    wherein content of said performance report is based on which of the categories said machine is assigned to.

11. The one or more computer-readable storage media of claim 7, wherein said machine is a member of a group of machines, and wherein said histogram is further based on performance counter values collected from all of the machines in said group.

12. The one or more computer-readable storage media of claim 7, wherein said performance counter values are bounded by a minimum and a maximum, and wherein said ranges are uniformly-sized numerical regions between said minimum and said maximum.

13. The one or more computer-readable storage media of claim 7, wherein said machine is one of a plurality of machines, and wherein the method further comprises:
    calculating said metric for each of said plurality of machines; and
    receiving a request to identify those ones of said plurality of machines whose metric exceeds a threshold;
    and wherein said presenting comprises:
    identifying, in said report, those ones of said plurality of machines whose metric exceeds said threshold.

14. The one or more computer-readable storage media of claim 7, wherein said machine is one of a plurality of machines, and wherein the method further comprises:
    calculating said metric for each of said plurality of machines; and
    receiving a request to identify n machines having the highest metrics;
    and wherein said presenting comprises:
    identifying, in said report, the n machines that have the highest metric among said plurality of machines.

15. A system comprising:
    a plurality of machines, wherein each of the machines comprises a performance counter that measures an aspect of the machines' performance, said performance counter having a maximum acquirable value; and
    an analyzer that is communicatively connected to a machine that is one of the plurality of machines, the analyzer comprising:

a histogram generator that receives a set of performance counter values captured at said machine, that creates a histogram having a plurality of bins corresponding to a plurality of ranges of performance counter values, each of the bins storing a count of occurrences of performance counter values in said set that fall into each of said ranges, each bin, i, having a representative value, r, that falls within each bin's range; and a metric calculator that calculates a metric for said machine based on a sum $\Sigma_i w_i c_i$ over all bins, i, in the histogram, where $w_i$ is a weight associated with the $i^{th}$ bin, where $c_i$ is the count of the $i^{th}$ bin, and where $w_i$ is proportional to a function $f(r)$ that grows faster than a linear function as said maximum acquirable value is approached; and wherein the system further comprises:

a report generator that generates a report that is based on or comprises said metric.

16. The system of claim 15, wherein said function $f(r)$ is $1/(1-r)^n$, where $0.5 \leq n \leq 4.0$.

17. The system of claim 15, wherein said metric calculator calculates metrics for said plurality of machines, and wherein said report generator selects those ones of said plurality of machines whose metrics exceed a threshold and indicates the selected machines in said report.

18. The system of claim 15, wherein said metric calculator calculates metrics for said plurality of machines, and wherein said report generator selects the n machines having the highest metrics and indicates the selected machines in said report.

19. The system of claim 15, wherein said report generator identifies a growth or a decline in said metric, and wherein said report is based on identification of said growth or said decline.

* * * * *